United States Patent
Korth et al.

(10) Patent No.: US 7,208,038 B2
(45) Date of Patent: *Apr. 24, 2007

(54) SILANE-MODIFIED BIOPOLYMERIC, BIOOLIGOMERIC, OXIDIC OR SILICEOUS FILLER, PROCESS FOR ITS PRODUCTION AND ITS USE

(75) Inventors: Karsten Korth, Wyhlen (DE);
Hans-Detlef Luginsland, Cologne (DE); Andre Hasse, Linnich (DE);
Ingo Kiefer, Schopfheim (DE);
Juergen Heidlas, Trostberg (DE)

(73) Assignee: Degussa AG, Duesseldorf (DE)

( * ) Notice: Subject to any disclaimer, the term of this patent is extended or adjusted under 35 U.S.C. 154(b) by 48 days.

This patent is subject to a terminal disclaimer.

(21) Appl. No.: 11/070,333

(22) Filed: Mar. 3, 2005

(65) Prior Publication Data

US 2005/0223946 A1 Oct. 13, 2005

Related U.S. Application Data

(63) Continuation of application No. 10/140,041, filed on May 8, 2002, now Pat. No. 6,893,495.

(30) Foreign Application Priority Data

May 8, 2001 (DE) ................................ 101 22 269

(51) Int. Cl.
- *C08K 3/34* (2006.01)
- *C08K 9/06* (2006.01)
- *C09C 1/00* (2006.01)
- *C09C 3/04* (2006.01)
- *C09C 3/12* (2006.01)

(52) U.S. Cl. ...................... 106/481; 106/482; 106/490; 106/491; 423/325; 423/335

(58) Field of Classification Search ................ 106/481, 106/482, 490, 491; 423/352, 335
See application file for complete search history.

(56) References Cited

U.S. PATENT DOCUMENTS

| | | | |
|---|---|---|---|
| 3,997,356 | A | 12/1976 | Thurn et al. |
| 4,099,981 | A | 7/1978 | Mui et al. |
| 4,278,206 | A * | 7/1981 | Prussin ..................... 239/327 |
| 6,013,234 | A | 1/2000 | Ray et al. |
| 6,022,404 | A | 2/2000 | Ettlinger et al. |
| 6,376,923 | B1 | 4/2002 | Sumita et al. |
| 6,413,490 | B1 | 7/2002 | Gilges et al. |
| 2003/0082090 | A1 | 5/2003 | Blume et al. |

FOREIGN PATENT DOCUMENTS

| | | |
|---|---|---|
| CA | 2303559 | 10/2000 |
| DE | 199 28 851 | 12/2000 |
| EP | 1 043 357 | 10/2000 |
| EP | 1 295 850 | 3/2003 |

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

Silane-modified biopolymeric, biooligomeric, oxidic or siliceous filler obtainable by reacting at least one biopolymeric, biooligomeric, oxidic or siliceous filler in a compressed gas with at least one silane. The silane-modified biopolymeric, biooligomeric, oxidic or siliceous fillers are used in rubber compounds.

6 Claims, No Drawings

SILANE-MODIFIED BIOPOLYMERIC, BIOOLIGOMERIC, OXIDIC OR SILICEOUS FILLER, PROCESS FOR ITS PRODUCTION AND ITS USE

This application is a Continuation of U.S. application Ser. No. 10/140,041, filed on May 8, 2002, now U.S. Pat. No. 6,893,495.

BACKGROUND OF THE INVENTION

1. Field of the Invention

The present invention relates to a silane-modified biopolymeric, biooligomeric, oxidic or siliceous filler, a process for its production and its use.

2. Description of the Background

The treatment of oxidic or siliceous compounds with organosilicon compounds in order by means of this treatment to strengthen the bond between the inorganic filler and the organic polymer used in filler-reinforced elastomers, and hence to improve the properties of the fillers in the polymers, is known.

It is known from DE 2141159, DE 2212239 and U.S. Pat. No. 3,978,103 that sulfur-containing organosilicon compounds such as bis(3-triethoxysilylpropyl) tetrasulfane or 3-mercaptopropyltriethoxysilane are used as silane bonding agent or reinforcing filler in oxidically filled rubber compounds, for tire treads and other automotive tire components among other things.

The use of mercaptosilanes in rubber compounds for tire treads is known from FR-A 152.094.859.

In order to circumvent the considerable problems in the processing of mercaptosilanes, such as pre-scorch, scorch and plasticity properties for example, polysulfidic organosilanes such as e.g. bis(3-triethoxysilylpropyl) tetrasulfane or bis(3-triethoxysilylpropyl) disulfane (DE 2542534, DE 2405758, DE 19541404, DE 19734295) are mostly used as a coupling agent for tire components, representing a compromise for silica-filled vulcanisates in terms of vulcanisation safety, ease of production and reinforcing performance.

The corresponding additives, especially the organosilanes and the unmodified fillers, can be introduced into the unvulcanised polymer blends in various ways.

The in-situ method involves a combined mixing process for fillers, such as carbon black and silica, organosilanes and polymer.

The ex-situ method involves modifying the filler with the corresponding organosilane or combining a mixture of various organosilanes before mixing the filler with the polymer.

It is known that the filler surface can be modified by dissolving the organosilicon compound in an organic solvent with subsequent treatment of fillers, e.g. clays (U.S. Pat. No. 3,227,675).

Liquid addition (U.S. Pat. No. 3,997,356) or addition of the active filler by means of a pre-produced physical blend of organosilane and filler (DE 3314742, U.S. Pat. No. 4,076,550) is particularly important today. The disadvantages of these blends, which do not undergo any thermal pretreatment, lie in their storage stability and hence in the stability of the product properties.

U.S. Pat. No. 4,151,154 describes oxidic siliceous fillers, the surface of which undergoes treatment with two different types of organosilicon compounds. The oxidic particles are treated in such a way that they exhibit a greater affinity to water and can also be more easily dispersed in aqueous systems.

The modification of kaolin suspended in water with various silanes is known from U.S. Pat. No. 3,567,680. The organosilicon compounds that are described are water-soluble in the quantities required for the modification, however, which means that in this case the filler can be treated from an aqueous solution.

U.S. Pat. No. 4,044,037 describes aryl polysulfides and mineral fillers treated with these compounds, which are used in rubber compounds. They are produced in an aqueous/alcoholic formulation containing 99.9 to 80 wt. % alcohol.

Moreover, a process in which the surface of siliceous fillers is modified with the aid of an aqueous emulsion of water-insoluble organosilicon compounds is known from EP-PS 01 26 871.

The known fillers modified ex situ with silane have the disadvantage that the dynamic rubber properties tend to be worse rather than the same as or better than those of fillers and silanes mixed together in situ. In the case of fillers with a large specific surface area or a raised surface texture, impregnation is not homogenous but instead is mostly confined to a thin surface layer and is therefore unsatisfactory.

The known methods for modifying fillers for rubber and plastic applications with surface-active silanes or mixtures thereof are based on the use of water, organic solvents or the direct spraying of the organosilicon compound onto the surface of the filler with a subsequent conditioning reaction. The water-insoluble, rubber-typical silanes can only be converted into hydrocarbon-based solvents, which are generally toxic and highly flammable.

Accordingly, there remains a need for silane-modified fillers which overcome these disadvantages.

SUMMARY OF THE INVENTION

It is an object of the present invention to produce a silane-modified biopolymeric, biooligomeric, oxidic or siliceous filler which displays an improved coverage of the surface with the corresponding rubber-reactive silanes and which therefore has comparable dynamic properties in rubber to known silane-filler blends produced in situ and displays better dynamic properties in rubber than known silane-filler blends produced ex situ.

Another object of the present invention is to provide a process for the modification of biopolymeric, biooligomeric, oxidic or siliceous fillers with silanes, in which the modification reaction is not performed in water or an organic solvent.

The objects of the present invention, and others, may be accomplished with a silane-modified biopolymeric, biooligomeric, oxidic or siliceous filler obtainable by reacting at least one biopolymeric, biooligomeric, oxidic or siliceous filler in a compressed gas with at least one silane.

The objects of the invention may also be accomplished with a process for the production of the silane-modified biopolymeric, biooligomeric, oxidic or siliceous filler according to claim 1, comprising reacting at least one biopolymeric, biooligomeric, oxidic or siliceous filler in a compressed gas with at least one silane.

The objects of the invention may also be accomplished with a rubber compound, which comprises a rubber and the silane-modified biopolymeric, biooligomeric, oxidic or siliceous filler described above.

The objects of the invention may also be accomplished with a rubber compound, which comprises a rubber and the silane-modified biopolymeric, biooligomeric, oxidic or siliceous filler described above.

The objects of the invention may also be accomplished with a method of producing a molded part, comprising molding the rubber compound described above into a molded part.

The objects of the invention may also be accomplished with a method of producing a article selected from the group consisting of pneumatic tires for cars and lorries, tire treads for cars and lorries, tire components for cars and lorries, cable sheaths, tubes, drive belts, conveyor belts, roll coverings, bicycle and motorcycle tires and components thereof, shoe soles, sealing rings, profiles and damping elements, comprising incorporating the rubber compound described above into the article.

A more complete appreciation of the invention and many of the attendant advantages thereof will be readily obtained as the same becomes better understood by reference to the following Figures in conjunction with the detailed description below.

DETAILED DESCRIPTION OF THE INVENTION

The invention provides a silane-modified biopolymeric, biooligomeric, oxidic or siliceous filler obtainable by reacting at least one biopolymeric, biooligomeric, oxidic or siliceous filler in a compressed gas with at least one silane. The silane-modified biopolymeric, biooligomeric, oxidic or siliceous filler can have a BET surface area of between 0.5 $m^2/g$ and 500 $m^2/g$, preferably between 5 and 250 $m^2/g$. These ranges include all specific values and subranges therebetween, such as 1, 2, 10, 25, 50, 100 and 300 $m^2/g$.

The silane-modified biopolymeric, biooligomeric, oxidic or siliceous filler can contain between 0.1 and 50.0 wt. %, preferably between 1.0 and 25.0 wt. %, particularly preferably between 1.0 and 9.0 wt. %, silane. These ranges include all specific values and subranges therebetween, such as 0.5, 2, 5, 10, 15, 30 and 40 wt. %.

The silane can be chemically and/or physically bonded to the surface of the fillers.

The invention also provides a process for the production of a silane-modified biopolymeric, biooligomeric, oxidic or siliceous filler, wherein at least one biopolymeric, biooligomeric, oxidic or siliceous filler is reacted in a compressed gas with at least one silane.

An organosilicon compound having the general formula (I)

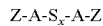

$$Z\text{-}A\text{-}S_x\text{-}A\text{-}Z \quad (I)$$

can be used as the silane, in which x is a number from 1 to 12, preferably 1 to 8, particularly preferably 2 to 6, Z is equal to $SiX^1X^2X^3$ and $X^1$, $X^2$, $X^3$ can each mutually independently denote hydrogen (—H), halogen or hydroxy (—OH), an alkyl substituent, preferably methyl or ethyl, alkenyl acid substituent, for example acetoxy R—(C=O)O—, or a substituted alkyl or alkenyl acid substituent, for example oximato $R^1_2C$=NO—, a linear or branched hydrocarbon chain with 1–6 carbon atoms, a cycloalkyl radical with 5–12 carbon atoms, a benzyl radical or a halogen- or alkyl-substituted phenyl radical, alkoxy groups, preferably ($C_1$–$C_4$) alkoxy, particularly preferably methoxy or ethoxy, with linear or branched hydrocarbon chains with ($C_{1-6}$) atoms, a cycloalkoxy group with ($C_{5-12}$) atoms, a halogen- or alkyl-substituted phenoxy group or a benzyloxy group, A is a ($C_1$–$C_{16}$), preferably ($C_1$–$C_4$), branched or unbranched, saturated or unsaturated, aliphatic, aromatic or mixed aliphatic/aromatic divalent hydrocarbon group.

The group A can be linear or branched and can contain saturated as well as unsaturated bonds. A can be provided with a wide variety of substituents, such as e.g. —CN, halogens, for example —Cl, —Br or —F, —OH, alkoxides —$OR^1$ or —O—(C=O)—$R^1$. $CH_2$, $CH_2CH_2$, $CH_2CH_2CH_2$, $CH_2CH(CH_3)$, $CH_2CH_2CH_2CH_2$, $CH_2CH_2CH(CH_3)$, $CH_2CH(CH_3)CH_2$, $CH_2CH_2CH_2CH_2CH_2$, $CH_2CH(CH_3)CH_2CH_2$, $CH_2CH_2CH(CH_3)CH_2$, $CH(CH_3)CH_2CH(CH_3)$ or $CH_2CH(CH_3)CH(CH_3)$ can preferably be used as A.

The following compounds can for example be used as silane having the general formula (I):

$[(MeO)_3Si(CH_2)_3]_2S$, $[(MeO)_3Si(CH_2)_3]_2S_2$, $[(MeO)_3Si(CH_2)_3]_2S_3$, $[(MeO)_3Si(CH_2)_3]_2S_4$, $[(MeO)_3Si(CH_2)_3]_2S_5$, $[(MeO)_3Si(CH_2)_3]_2S_6$, $[(MeO)_3Si(CH_2)_3]_2S_7$, $[(MeO)_3Si(CH_2)_3]_2S_8$, $[(MeO)_3Si(CH_2)_3]_2S_9$, $[(MeO)_3Si(CH_2)_3]_2S_{10}$, $[(MeO)_3Si(CH_2)_3]_2S_{11}$, $[(MeO)_3Si(CH_2)_3]_2S_{12}$, $[(MeO)_3Si(CH_2)_3]_2S$, $[(EtO)_3Si(CH_2)_3]_2S_2$, $[(EtO)_3Si(CH_2)_3]_2S_3$, $[(EtO)_3Si(CH_2)_3]_2S_4$, $[(EtO)_3Si(CH_2)_3]_2S_5$, $[(EtO)_3Si(CH_2)_3]_2S_6$, $[(EtO)_3Si(CH_2)_3]_2S_7$, $[(EtO)_3Si(CH_{23})_2]_2S_8$, $[(EtO)_3Si(CH_2)_3]_2S_9$, $[(EtO)_3Si(CH_2)_3]_2S_{10}$, $[(EtO)_3Si(CH_2)_3]_2S_{11}$, $[(EtO)_3Si(CH_2)_3]_2S_{12}$, $[(C_3H_7O)_3Si(CH_2)_3]_2S$, $[(C_3H_7O)_3Si(CH_2)_3]S_2S_2$, $[(C_3H_7O)_3Si(CH_2)_3]_2S_3$, $[(C_3H_7O)_3Si(CH_2)_3]_2S_4$, $[(C_3H_7O)_3Si(CH_2)_3]_2S_5$, $[(C_3H_7O)_3Si(CH_2)_3]_2S_6$, $[(C_3H_7O)_3Si(CH_2)_3]_2S_7$, $[(C_3H_7O)_3Si(CH_2)_3]_2S_8$, $[(C_3H_7O)_3Si(CH_2)_3]_2S_9$, $[(C_3H_7O)_3Si(CH_2)_3]_2S_{10}$, $[(C_3H_7O)_3Si(CH_2)_3]_2S_{11}$ or $[(C_3H_7O)_3Si(CH_2)_3]_2S_{12}$.

Compounds described in DE 198 44 607 (incorporated herein by reference) can also be used as the silane.

An organosilicon compound having the general formula (II)

$$X^1X^2X^3Si\text{-}A\text{-}S\text{—}SiR^1R^2R^3 \quad (II)$$

can be used as the silane, in which $X^1$, $X^2$, $X^3$ and A mutually independently have the same meaning as in formula (I), $R^1$, $R^2$, $R^3$ are each mutually independent and denote ($C_1$–$C_{16}$) alkyl, preferably ($C_1$–$C_4$) alkyl, particularly preferably methyl and ethyl, ($C_1$–$C_{16}$) alkoxy, preferably ($C_1$–$C_4$) alkoxy, particularly preferably methoxy and ethoxy, ($C_1$–$C_{16}$) haloalkyl, aryl, ($C_7$–$C_{16}$) aralkyl, H, halogen or $X^1X^2X^3Si\text{-}A\text{-}S\text{—}$.

The following compounds can for example be used as the silane having the general formula (II):

$(EtO)_3$—Si—$(CH_2)_3$—S—Si$(CH_3)_3$, $[(EtO)_3$—Si—$(CH_2)_3$—S$]_2Si(CH_3)_2$, $[(EtO)_3$—Si—$(CH_2)_3$—S$]_3Si(CH_3)$, $[(EtO)_3$—Si—$(CH_2)_3$—S$]_2Si(OEt)_2$, $[(EtO)_3$—Si—$(CH_2)_3$—S$]_4Si$, $(EtO)_3$—Si—$(CH_2)_3$—S—Si$(OEt)_3$, $(MeO)_3$—Si—$(CH_2)_3$—S—Si$(C_2H_5)_3$, $[(MeO)_3$—Si—$(CH_2)_3$—S$]_2Si(C_2H_5)_2$, $[MeO)_3$—Si—

$(CH_2)_3$—S]$_3$Si(CH$_3$), [MeO)$_3$—Si—(CH$_2$)$_3$—S]$_2$Si(OMe)$_2$, [(MeO)$_3$—Si—(CH$_2$)$_3$—S]$_4$Si, (MeO)$_3$—Si—(CH$_2$)$_3$—S—Si(OMe)$_3$, (EtO)$_3$—Si—(CH$_2$)$_2$—CH(CH$_3$)—S—Si(CH$_3$)$_3$, (EtO)$_3$—Si—(CH$_2$)$_2$—CH(CH$_3$)—S—Si(C$_2$H$_5$)$_3$, (EtO)$_3$—Si—(CH$_2$)$_2$—CH(CH$_3$)—S—Si(C$_6$H$_5$)$_3$ or (EtO)$_3$—Si—(CH$_2$)$_2$(p-C$_6$H$_4$)—S—Si(CH$_3$)$_3$.

An organosilicon compound having the general formula (III)

$$X^1X^2X^3\text{Si-Alk} \qquad (III)$$

can be used as the silane, in which $X^1$, $X^2$, $X^3$ each mutually independently have the same meaning as in formula (I) and Alk is a straight-chain, branched or cyclic ($C_1$–$C_{18}$) alkyl, for example methyl, ethyl, n-propyl, n-butyl, n-pentyl, n-hexyl, isopropyl or tert-butyl, ($C_1$–$C_5$) alkoxy, for example methoxy, ethoxy, propoxy, butoxy, isopropoxy or pentoxy, halogen, for example fluorine, chlorine, bromine or iodine, hydroxy, thiol, nitrile, ($C_1$–$C_4$) haloalkyl, —NO$_2$, ($C_1$–$C_8$) thioalkyl, —NH$_2$, —NHR$^1$, —NR$^1$R$^2$, alkenyl, allyl, vinyl, aryl or ($C_7$–$C_{16}$) aralkyl.

The term alkenyl can include the vinyl group as well as straight-chain, branched or cyclic fragments, which can contain one or more carbon double bonds.

The term cyclic alkyl or alkenyl fragments can include both monocyclic and bicyclic or polycyclic structures, and cyclic structures provided with alkyl substituents, for example norbornyl, norbornenyl, ethylnorbornyl, ethylnorbornenyl, ethylcyclohexyl, ethylcyclohexenyl or cyclohexylcyclohexyl groups.

Aryl can refer to phenyls, biphenyls or other benzenoid compounds, which are optionally substituted with ($C_1$–$C_3$) alkyl, ($C_1$–$C_3$) alkoxy, halogen, hydroxy or hetero atoms, such as NR$^1$R$^2$OR$^1$, PR$^1$R$^2$R$^3$, SH or SR$^1$.

Aralkyls can be the aryls listed above, which can be bonded to the corresponding silicon atom or sulfur atom or to both by a ($C_1$–$C_6$) alkyl chain, which in turn can be substituted with ($C_1$–$C_3$) alkyl, ($C_1$–$C_3$) alkoxy or halogen. If the aryl group has a hetero atom such as O or S, the ($C_1$–$C_6$) alkyl chain can also be bonded to the silicon atom and/or the sulfur atom via the hetero atom.

The following compounds can for example be used as the silane having the general formula (III):
(EtO)$_3$—Si—(CH$_2$)$_3$—H, (MeO)$_3$—Si—(CH$_2$)$_3$—H, (EtO)$_3$—Si—(CH$_2$)$_8$—H, (MeO)$_3$—Si—(CH$_2$)$_8$—H, (EtO)$_3$—Si—(CH$_2$)$_{16}$—H, (MeO)$_3$—Si—(CH$_2$)$_{16}$—H, (Me)$_3$Si—(OMe), ((Et)$_3$Si—(OMe), (C$_3$H$_7$)$_3$Si—(OMe), (C$_6$H$_5$)$_3$Si—(OMe), (Me)$_3$Si—(OEt), ((Et)$_3$Si—(OEt), (C$_3$H$_7$)$_3$Si—(OEt), (C$_6$H$_5$)$_3$Si—(OEt), (Me)$_3$Si—(OC$_3$H$_7$), ((Et)$_3$Si—(OC$_3$H$_7$), (C$_3$H$_7$)$_3$Si—(OC$_3$H$_7$), (C$_6$H$_5$)$_3$Si—(OC$_3$H$_7$), (Me)$_3$SiCl, ((Et)$_3$SiCl, (C$_3$H$_7$)$_3$SiCl, (C$_6$H$_5$)$_3$SiCl, Cl$_3$—Si—CH$_2$—CH═CH$_2$, (MeO)$_3$—Si—CH$_2$—CH═CH$_2$, (EtO)$_3$—Si—CH$_2$—CH═CH$_2$, Cl$_3$—Si—CH═CH$_2$, (MeO)$_3$Si—CH═CH$_2$ or (EtO)$_3$—Si—CH═CH$_2$.

An organosilicon compound having the general formulae (IV) or (V)

$$[[ROC(=O)]_p\text{-}(G)_j]_k\text{-}Y\text{-}S]_r\text{-}G\text{-}(SiX^1X^2X^3)_s \qquad (IV)$$

$$[(X^1X^2X^3Si)_q\text{-}G]_a\text{-}[Y\text{-}[S\text{-}G\text{-}SiX^1X^2X^3]_b]_c \qquad (V)$$

can be used as the silane, in which Y represents a polyvalent species (Q)$_z$D(═E), whereby the following applies:

p is 0 to 5, r is 1 to 3, z is 0 to 2, q is 0 to 6, a is 0 to 7, b is 1 to 3, j is 0 to 1, but if p═1 it can also commonly be 0, c is 1 to 6, preferably 1 to 4, t is 0 to 5, s is 1 to 3, k is 1 to 2, on condition that (1) if (D) is a carbon, sulfur or sulfonyl, a+b═2 and k═1,
(2) if (D) is a phosphorus atom, a+b═3 as long as c≧1 and b═1, whereby a═c+1,
(3) if (D) is a phosphorus atom, k═2, Y represents a polyvalent species (Q)$_z$D(═E), preferably —C(═NR)—, —SC(═NR)—, —SC(═O)—, (—NR)C(═O)—, (—NR)C(═S)—, —OC(═O)—, —OC(═S)—, —C(═O)—, —SC(═S)—, —C(═S)—, —S(═O)—, —S(═O)$_2$—, —OS(═O)$_2$—, (—NR)S(═O)$_2$—, —SS(═O)—, —OS(═O)—, (NR)S(═O)—, —SS(═O)$_2$—, (—S)$_2$P(═O)—, —(—S)P(═O)—, —P(═O)(-)$_2$, (—S)$_2$P(═S)—, —(—S)P(═S)—, —P(═S)(-)$_2$, (—NR)$_2$P(═O)—, (—NR)(—S)P(═O)—, (—O)(—NR)P(═O)—, (—O)(—S)P(═O)—, (—O)$_2$P(═O)—, —(—O)P(═O)—, —(—NR)P(═O)—, (—NR)$_2$P(═S)—, (—NR)(—S)P(═S)—, (—O)(—NR)P(═S)—, (—O)(—S)P(═S)—, (—O)$_2$P(═S)—, —(—O)P(═S)— or —(—NR)P(═S)—, in each of these groups the atom (D) is doubly bonded to the hetero atom (E), which in turn is bonded to the sulfur atom (S), which is coupled to the silicon atom (Si) by means of a group (G), R$^1$ mutually independently denotes H, a straight, cyclic or branched alkyl chain, preferably ($C_1$–$C_{18}$) alkyl, particularly preferably ($C_1$–$C_4$) alkyl, optionally alkyl chains containing unsaturated components such as double bonds (alkenes), triple bonds (alkines) or alkyl aromatics (aralkyl) or aromatics and having the same meanings as in formula (II), G independently of the other substituents denotes hydrogen, a straight, cyclic or branched alkyl chain with ($C_1$–$C_{18}$), the alkyl chains can optionally contain an unsaturated component, such as double bonds (alkenes), triple bonds (alkynes) or alkyl aromatics (aralkyl) or aromatics, if p═0 in formula (IV), G is preferably hydrogen (H), G does not correspond to the structure of an α,β-unsaturated fragment which is bonded to the Y fragment in such a way that an α,β-unsaturated thiocarbonyl fragment is formed, $X^1$, $X^2$ and $X^3$ each mutually independently have the meaning as in formula (I).

An index p of 0 to 2 is preferred, whereby $X^1$, $X^2$ or $X^3$ is an RO— for example RC(═O)O—. A fragment where p═0, $X^1$, $X^2$ for example $X^3$═ethoxy and where G═alkyl skeleton or substituted alkyl skeleton with C$_3$ to C$_{12}$ is particularly preferred. At least one X need not be equal to —R$^1$.

In (Q)$_z$D(═E) Q can be oxygen, sulfur or (—NR—), D can be carbon, sulfur, phosphorus or sulfonyl, E can be oxygen, sulfur or (═NR$^1$).

Preferred examples for the (—YS—) function in formulae (IV) and (V) are:

thiocarboxylate esters —C(═O)—S—, dithiocarboxylates —C(═S)—S—, thiocarbonate esters —O—C(═O)—S—, dithiocarbonate esters —S—C(═O)—S— and —O—C(═S)—S—, trithiocarbonate esters —S—C(═S)—S—, dithiocarbamate esters —N—C(═S)—S—, thiosulfonate esters —S(═O)$_2$—S—, thiosulfate esters —O—S(═O)$_2$—S—, thiosulfamate esters (—N—)S(═O)$_2$—S—, thiosulfinate esters —C—S(═O)—S—, thiosulfite esters —O—S(=O)—S—, thiosulfimate esters N—S(=O)—S—, thiophosphate esters P(=O)(O—)₂(S—), dithiophosphate esters P(=O)(O—)(S—)₂ or P(=S)(O—)₂(S—), trithiophosphate esters P(=O)(S—)₃ or P(=S)(O—)(S—)₂, tetrathiophosphate esters P(=S)(S—)₃, thiophosphamate esters —P(=O)(—N—)(S—), dithiophosphamate esters —P(=S)(—N—)(S—), thiophosphoramidate esters (—N—)P(=O)(O—)(S—), dithiophosphoramidate esters (—N—)P(=O)(S-)₂ or (—N—)P(=S)(O—)(S—) or trithiophosphoramidate esters (—N—)P(=S)(S—)₂.

The following compounds can for example be used as silane having the general formula (IV) or (V):

2-triethoxysilyl-1-ethyl thioacetate, 2-trimethoxysilyl-1-ethyl thioacetate, 2-(methyldimethoxysilyl)-1-ethyl thioacetate, 3-trimethoxysilyl-1-propyl thioacetate, triethoxysilyl methyl thioacetate, trimethoxysilyl methyl thioacetate, triisopropoxysilyl methyl thioacetate, methyldiethoxysilyl methyl thioacetate, methyldimethoxysilyl methyl thioacetate, methyldiisopropoxysilyl methyl thioacetate, dimethylethoxysilyl methyl thioacetate, dimethylmethoxysilyl methyl thioacetate, dimethylisopropoxysilyl methyl thioacetate, 2-triisopropoxysilyl-1-ethyl thioacetate, 2-(methyldiethoxysilyl)-1-ethyl thioacetate, 2-(methyldiisopropoxysilyl)-1-ethyl thioacetate, 2-(dimethylethoxysilyl)-1-ethyl thioacetate, 2-(dimethylmethoxysilyl)-1-ethyl thioacetate, 2-(dimethylisopropoxysilyl)-1-ethyl thioacetate, 3-triethoxysilyl-1-propyl thioacetate, 3-triisopropoxysilyl-1-propyl thioacetate, 3-methyldiethoxysilyl-1-propyl thioacetate, 3-methyldimethoxysilyl-1-propyl thioacetate, 3-methyldiisopropoxysilyl-1-propyl thioacetate, 1-(2-triethoxysilyl-1-ethyl)-4-thioacetyl cyclohexane, 1-(2-triethoxysilyl-1-ethyl)-3-thioacetyl cyclohexane, 2-triethoxysilyl-5-thioacetyl norbornene, 2-triethoxysilyl-4-thioacetyl norbornene, 2-(2-triethoxysilyl-1-ethyl)-5-thioacetyl norbornene, 2-(2-triethoxysilyl-1-ethyl)-4-thioacetyl norbornene, 1-(1-oxo-2-thia-5-triethoxysilylphenyl benzoic acid, 6-triethoxysilyl-1-hexyl thioacetate, 1-triethoxysilyl-5-hexyl thioacetate, 8-triethoxysilyl-1-octyl thioacetate, 1-triethoxysilyl-7-octyl thioacetate, 6-triethoxysilyl-1-hexyl thioacetate, 1-triethoxysilyl-5-octyl thioacetate, 8-trimethoxysilyl-1-octyl thioacetate, 1-trimethoxysilyl-7-octyl thioacetate, 10-triethoxysilyl-1-decyl thioacetate, 1-triethoxysilyl-9-decyl thioacetate, 1-triethoxysilyl-2-butyl thioacetate, 1-triethoxysilyl-3-butyl thioacetate, 1-triethoxysilyl-3-methyl-2-butyl thioacetate, 1-triethoxysilyl-3-methyl-3-butyl thioacetate, 3-trimethoxysilyl-1-propyl thiooctoate, 3-triethoxysilyl-1-propyl thiopalmitate, 3-triethoxysilyl-1-propyl thiooctoate, 3-triethoxysilyl-1-propyl thiobenzoate, 3-triethoxysilyl-1-propyl thio-2-ethylhexanoate, 3-methyldiacetoxysilyl-1-propyl thioacetate, 3-triacetoxysilyl-1-propyl thioacetate, 2-methyl diacetoxysilyl- 1-ethyl thioacetate, 2-triacetoxysilyl- 1-ethyl thioacetate, 1-methyldiacetoxysilyl-1-ethyl thioacetate or 1-triacetoxysilyl-1-ethyl thioacetate.

An organosilicon compound having the general formula (VI)

$$X^1X^2X^3Si\text{-}A\text{-}Sub \quad (VI)$$

can be used as silane, whereby $X^1$, $X^2$, $X^3$ and A each mutually independently have the meaning according to formula (I) and Sub is —SH, —Cl, -Br, —I, —NH₂, —NH(A-SiX¹X²X³), —N(A-SiX¹X²X³)₂, —N—H—CH₂—CH₂—NH₂, NH—CH₂—CH₂—NH—CH₂—CH₂—NH₂, NHEt, NEt₂, NH(C₄H₉), O—C(O)—CMe=CH₂, O—CH₂—(CHO—CH₂) (DS glymo) or —SCN.

The following compounds can for example be used as the silane having the general formula (VI):
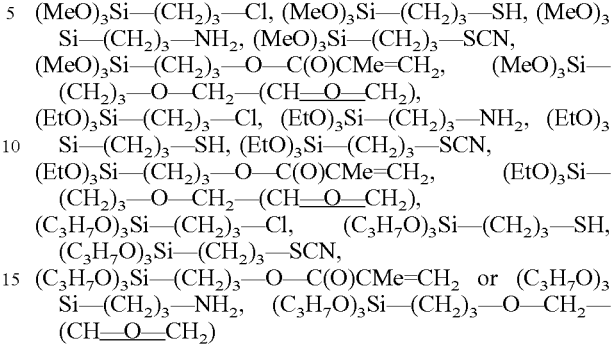

Oligomers of organosilicon compounds having the general formula (I) to (VI) can be used as the silane. The oligomers can be produced by oligomerisation or co-oligomerisation.

Oligomeric silanes are described for example in EP 652 245 B1, EP 0 700 951 B1, EP 0 978 525 A2 and DE 199 29 021 A1. Each of these publications is incorporated herein by reference.

Mixtures of silanes can also be used as silane compounds for modifying fillers, for example mixtures of silanes having the general formula I–VI or mixtures of the oligomeric or polymeric siloxanes of silanes having the general formula I–VI or mixtures of silanes having the general formula I–VI with mixtures of the oligomeric or polymeric siloxanes of silanes having the general formula I–VI.

A natural and/or synthetic filler can be used as biopolymeric, biooligomeric, oxidic or siliceous filler.

The biopolymeric, biooligomeric, oxidic or siliceous filler can contain —OH or —O acetate, for example —O—C(O)—CH₃, groups at the surface, which can react with the reactive groups of the silanes used, preferably their alkoxy groups.

The biopolymeric, biooligomeric, oxidic or siliceous filler can be compatible with rubbers and display the fine-particle character and reinforcing effect in the polymer matrix that is necessary for this use.

Natural or modified starch, cellulose, amylose, amylopectin, cellulose acetate, maltose, cellobiose, lactose, sucrose, raffinose, glycogen, pectins, chitin or natural or modified proteins can be used as biopolymeric or biooligomeric filler.

Silicate, for example kaolin, mica, kieselguhr, diatomaceous earth, talc, wollastonite or clay as well as silicates inter alia in the form of glass fibres or glass fabrics can be used as natural siliceous filler.

Almost all types of oxides, for example aluminium oxide, aluminium hydroxide or trihydrate, zinc oxide, boron oxides, magnesium oxides or transition-metal oxides such as titanium dioxide, can be used as oxidic fillers.

Moreover, aluminium silicates, silicates, zeolites, precipitated or pyrogenic silicic acids with BET surface areas (measured with gaseous nitrogen) of 1 to 1000 m²/g, preferably to 300 m²/g, can be used as oxidic or siliceous filler.

By way of example, the precipitated silicic acids sold by Degussa-Hüls AG under the trade name Ultrasil (Ultrasil 7000 GR, Ultrasil VN 3, Ultrasil VN 3 GR, Ultrasil VN 2 and Ultrasil VN 2 GR), the Hisil range of silicic acids sold by PPG Industries Inc. (Hi-Sil® 195G, Hi-Sil® 190G, Hi-Sil® 170G, Hi-Sil® 255G, Hi-Sil® EZ, Hi-Sil® 243LD, Hi-Sil® 233, Hi-Sil® 315) and the Zeosil range of products sold by Rhodia, for example Zeosil 115 Gr, Zeosil 125 Gr, Zeosil 145 Gr, Zeosil 165 Gr, Zeosil 175 Gr, Zeosil 195 Gr, Zeosil 215 Gr, can be used. The same is true of silicic acids from other manufacturers having similar properties for example product characteristics or analytical data like the silicic acids mentioned above.

Compounds that are gaseous under normal temperature and pressure conditions and are suitable as a carrier fluid for silanes can be used as compressed gas. Carbon dioxide, helium, nitrogen, dinitrogen monoxide, sulfur hexafluoride, gaseous alkanes with 1 to 5 C atoms (methane, ethane, propane, n-butane, isobutane, neopentane), gaseous alkenes with 2 to 4 C atoms (ethylene, propylene, butene), gaseous alkines (acetylene, propyne and but-1-yne), gaseous dienes (propadiene), gaseous fluorocarbons, chlorinated hydrocarbons and/or chlorofluorocarbons (freons, CFCs, HCFCs) or substitutes thereof used because of current legislation, or ammonia, and mixtures of these substances, can be used by way of example.

Carbon dioxide can preferably be used as compressed gas since it is non-toxic, non-combustible, poorly reactive and inexpensive. Furthermore, the necessary supercritical conditions can easily be achieved since the critical pressure and critical temperature are 73 bar and 31° C. respectively. The compressed carbon dioxide used as compressed gas can also have a bacteriostatic effect.

Compressed gases can be defined according to E. Stahl, K. W. Quirin, D. Gerard, "Verdichtete Gase zur Extraktion und Raffination", Springer-Verlag, page 12–13, incorporated herein by reference. Compressed gases can be supercritical gases, critical gases or gases in the liquefied region.

The compressed gas is extremely advantageous for this special application. Thanks to the high solubilising power and diffusibility, the low viscosity and the ability to enable in particular silanes or silane oligomers to have high diffusion rates in the compressed gas, so that a substance can be deposited in the interstices of the microporous substrate, they are extremely suitable for impregnating microporous solids with monomeric or oligomeric substances. After application the silanes can be transported by the compressed gas into the pores and channels of the porous fillers. Furthermore, since compressed gases are gaseous under normal conditions they can easily be separated from the filler after treatment and in the case of carbon dioxide in particular they also have virtually no environmentally hazardous potential since they disappear into the natural carbon cycle or can easily be recycled.

The compressed gas can be placed under pressure in a chamber or container with an air-tight seal containing the material to be treated. During this process the pressure can be raised, generally from atmospheric pressure, to the operating pressure of the process according to the invention.

First of all the biopolymeric, biooligomeric, oxidic or siliceous filler can be brought into contact with a liquid consisting of the pure solvent, more precisely the gas that is potentially transformable into the compressed state, or of a pre-prepared solution of silane in the above gas, which is subsequently converted to the compressed state. This contact can be established for example in a container or in a hermetically sealed chamber into which the unmodified filler and the silane-containing gas matrix are introduced. "Establishing contact" can mean that the cited material is immersed in the impregnating liquid and wetted and covered by it, preferably that the biopolymeric, biooligomeric, oxidic or siliceous filler is completely immersed, or that all external and internal surfaces of the biopolymeric, biooligomeric, oxidic or siliceous filler are in contact with the silane-containing impregnating liquid.

In the process according to the invention the pressure, which is also known as the operating pressure, can generally be between 1 and 500 bar, preferably between 1 and 400 bar, particularly preferably between 1 and 300 bar. These ranges include all specific values and subranges therebetween, such as 2, 5, 10, 50, 100, 200 and 250 bar.

The temperature (operating temperature) at which the process can be performed is between 0 and 300° C., preferably between 0 and 200° C., particularly preferably between 10 and 120° C. These ranges include all specific values and subranges therebetween, such as 20, 50, 100 and 150° C.

The solubility of the silane in the compressed gas can be dependent on its type, on the pressure and the temperature; it can also be modulated and optimised, primarily by altering the last two parameters in order to adjust the physical properties of the silane-containing impregnating mixture. In many cases the concentration of the silane in the solution used as reaction medium can influence the efficacy of the treatment.

The reaction can be performed in a typical reaction vessel for high-temperature/high-pressure reactions or high-pressure extractions.

During the modification the pressure can be kept constant at various pressure levels for periods of 5–720 min, preferably 5–240 min, particularly preferably 5–30 min, and during this time the filler can be immersed in the compressed gas, stirred in it or the gas can be passed through it.

The biopolymeric, biooligomeric, oxidic or siliceous filler and the silane can be continuously circulated with a suitable stirring device. The stirring speed can be adjusted to the prevailing temperature and to the pressure prevailing at that temperature.

A lifting agitator, blade agitator, straight-arm paddle agitator, perforated paddle agitator, cross-arm paddle agitator, anchor agitator, gate agitator, blade roll, propeller agitator, screw mixer, turbine agitator, disc agitator, planetary-type agitator, centrifugal mixer or impeller agitator can be used as the stirring device.

The stirring device can operate at 1–200 revolutions, strokes or circulations per minute.

The silanes used can be undissolved, partially dissolved or wholly dissolved in the compressed gas.

The biopolymeric, biooligomeric, oxidic or siliceous filler and the silane can first be thoroughly mixed together or brought into contact and then mixed with the gas in the compressed state.

The biopolymeric, biooligomeric, oxidic or siliceous filler can first be thoroughly mixed or brought into contact with the gas in the compressed state and only then mixed with the silane.

The silane can first be thoroughly mixed or brought into contact with the gas in the compressed state and only then mixed with the corresponding biopolymeric, biooligomeric, oxidic or siliceous filler.

Following the surface modification, the silane-modified biopolymeric, biooligomeric, oxidic or siliceous filler can include an evacuation or release stage with separation of the compressed gas from the end product.

The evacuation or release stage can be performed in less than 10 min.

The evacuation or release stage can be performed in a time of between 10 min and 180 min, preferably between 10 min and 120 min, particularly preferably between 10 min and 60 min.

The evacuation or release stage can be performed at temperatures of between 1 and 300° C., preferably between 1 and 100° C., particularly preferably between 50 and 100° C., and most particularly preferably at temperatures of between 70 and 100° C.

The invention also provides rubber compounds wherein they contain rubber, the silane-modified biopolymeric, biooligomeric, oxidic or siliceous filler according to the invention, optionally precipitated silicic acid and/or carbon black and/or other rubber auxiliary substances.

Natural rubber or synthetic rubbers can be used to produce rubber compounds according to the invention. Preferred synthetic rubbers are described for example in W. Hofmann, Kautschuktechnologie, Genter Verlag, Stuttgart 1980. They include inter alia polybutadiene (BR), polyisoprene (IR), styrene/butadiene copolymers with styrene contents of 1 to 60, preferably 5 to 50 wt. % (E-SBR or S-SBR), isobutylene/isoprene copolymers (IIR), butadiene/acrylonitrile copolymers with acrylonitrile contents of 5 to 60, preferably 10 to 50 wt. % (NBR), ethylene/propylene/diene copolymers (EPDM), and mixtures of these rubbers.

The rubber compounds according to the invention can contain additional rubber auxiliary products, such as e.g. reaction accelerators, retarders, antioxidants, stabilisers, processing aids, plasticisers, waxes, metal oxides and activators, such as triethanolamine, polyethylene glycol or hexanetriol, as well as other rubber auxiliary products known to the rubber industry.

The rubber auxiliary substances can be used in conventional quantities, which depend inter alia on the intended application. Conventional quantities are for example quantities of 0.1 to 50 wt. % relative to rubber.

Sulfur, organic sulfur donors or radical formers can be used as crosslinkers. The rubber compounds according to the invention can also contain vulcanisation accelerators.

Examples of suitable vulcanisation accelerators are mercaptobenzothiazoles, sulfenamides, guanidines, thiurams, dithiocarbamates, thio ureas and thiocarbonates.

The vulcanisation accelerators and crosslinkers can be used in quantities of 0.1 to 10 wt. %, preferably 0.1 to 5 wt. %, relative to rubber.

The rubbers can be mixed with the filler according to the invention, optionally with precipitated silicic acid and/or carbon black and/or other rubber auxiliary substances in conventional mixing units, such as rolls, internal mixers and compounding extruders. Such rubber compounds can conventionally be produced in internal mixers, whereby the rubbers, the filler according to the invention, optionally the precipitated silicic acid and/or carbon black and/or other rubber auxiliary substances are first incorporated at 100 to 170° C. in one or more successive thermomechanical mixing stages. The sequence and time of addition of the individual components can have a critical influence on the compound properties obtained. The rubber compound thus obtained can then be combined with the crosslinking chemicals by known means in an internal mixer or on a roll at 40 to 110° C. and processed into the so-called unvulcanised mix for the subsequent process steps, such as moulding and vulcanisation for example.

Vulcanization of the rubber compounds according to the invention can take place at temperatures of 80 to 200° C., preferably 130 to 180° C., optionally under pressure of 10 to 200 bar.

The rubber compounds according to the invention are suitable for the production of moulded parts made from rubber, for example for the production of pneumatic tires for cars and lorries, tire treads for cars and lorries, tire components for cars and lorries, such as e.g. side wall, internal liner and undertread, cable sheaths, tubes, drive belts, conveyor belts, roll coverings, bicycle and motorcycle tires and components thereof, shoe soles, sealing rings, profiles and damping elements.

In comparison to the purely physical blends, of bis(3-triethoxysilylpropyl) tetrasulfane with silicic acid for example, such as are known e.g. from U.S. Pat. No. 4,076,550, incorporated herein by reference, the silane-modified biopolymeric, biooligomeric, oxidic or siliceous fillers according to the invention display the advantage of good storage stability and hence performance stability.

In comparison to the in-situ method that has already been used for years in the rubber industry and the untreated filler that this method requires, the silane-modified biopolymeric, biooligomeric, oxidic or siliceous fillers according to the invention have the advantages of a low water content in the treated filler, a low moisture absorbency, and a higher compacted bulk weight and a higher bulk density in comparison to the untreated filler. Compared to known silane-modified fillers they are characterised by a better storage stability, better dispersion in rubber and furthermore by better processing characteristics for users in the rubber-processing industry (homogeneous compounding, fewer mixing stages and shorter mixing times).

Whereas during the mixing process in the in-situ method a chemical reaction has to be performed in which an optimum process control is required, and the silanisation reaction releases considerable amounts of alcohol, which escape from the compound and lead to problems in the exhaust air, this is avoided by the use of the fillers according to the invention.

EXAMPLES

Having generally described this invention, a further understanding can be obtained by reference to certain specific examples which are provided herein for purposes of illustration only and are not intended to be limiting unless otherwise specified.

Examples of the Production of a Filler According to the Invention

Filler According to the Invention, Example A 1500 g of Ultrasil VN3 are introduced into a drum mixer (4 baffles measuring 7 cm in height). The drum is rotated at a speed of 20 rpm on a rolling stand at an incline of 18°. Over 55 min 120 g Si 69 (8 phf) are sprayed in through a 6 cm hole in the cover of the drum using a commercial manual spray pump. The drum is then allowed to run down for 5 min.

130 g of the silicic acid pretreated with Si 69 are then introduced into the 600 ml charge vessel of a high-pressure extraction autoclave preheated to 70° C. The pressure is slowly raised to 150 bar by pumping in $CO_2$. After being allowed to stand for 15 min the temperature is raised to 100° C. by heating the jacket of the autoclave. The system is kept constant for one hour at 100° C. and 200 bar. The pressure is then slowly reduced to 80 bar. Extraction is performed with 1.2 kg $CO_2$ for 25 min at 80 bar and 100° C. Extraction is then performed with 0.5 kg $CO_2$ for 30 min at 300 bar and 80° C. The system is then decompressed and the finished filler removed.

Filler According to the Invention, Example B 2000 g of Ultrasil VN3 are dried for 2 h in a circulating air oven at 105° C. 1500 g of the dried Ultrasil VN3 are introduced into a drum mixer (4 baffles measuring 7 cm in height). The drum is rotated at a speed of 20 rpm on a rolling stand at an incline of 18°. Over 55 min 120 g Si 69 (8 phf) are sprayed in through a 6 cm hole in the cover of the drum using a commercial manual spray pump. The drum is then allowed to run down for 5 min.

130 g of the silicic acid pretreated with Si 69 are then introduced into the 600 ml charge vessel of a high-pressure extraction autoclave preheated to 70° C. The pressure is slowly raised to 150 bar by pumping in $CO_2$. After being allowed to stand for 15 min the temperature is raised to 100° C. by heating the jacket of the autoclave. The system is kept constant for one hour at 100° C. and 200 bar. The pressure is then slowly reduced to 80 bar. Extraction is performed with 1.2 kg $CO_2$ for 25 min at 80 bar and 100° C. Extraction is then performed with 0.5 kg $CO_2$ for 30 min at 300 bar and 80° C. The system is then decompressed and the finished filler removed.

Filler According to the Invention, Example C 1650 g of the powder from a precipitated silicic acid Ultrasil VN3 and 132 g (8 phf) Si69 are placed in a 15 l steel autoclave with a magnetically coupled lifting agitator. An internal autoclave pressure of 155 bar at a temperature of 90° C. is then established with $CO_2$ and jacket heating. The mixture is left for 1 hour at 90° C. and 155 bar. The sample is then returned to normal pressure, as a result of which it is cooled. A finely powdered, colourless filler is obtained, which can be used without special processing.

The residual alcohol (ethanol) on the filler is determined as follows by reference to the procedure described in Kautschuk, Gummi, Kunststoffe 51, (1998) 525 von Hunsche et al.:

10 ml diethylene glycol monobutyl ether (DEGMBE) and 0.3 ml 0.5 mol/l $H_2SO_4$ are added to 1 g of the filler according to the invention in a glass ampoule which after being filled is closed with a tight-fitting cap. The mixture is thoroughly mixed in the glass ampoule for 20 min at 60° C. in a water bath. 10 ml decane is then added to the mixture, which has quickly been brought to a temperature of 25° C. Appropriate amounts are then removed from the organic phase for HPLC analysis on ethanol (HPLC apparatus with Jasco 851-AS autosampler, Jasco PU 980 pump, 7515A RI detector; $TiO_2$ column, 250×4.5 mm, 5 μm, YMC.; mobile phase: DEGMBE with cyclohexane; temperature 25° C.).

It can thus be shown for example that of the original 6 equivalents of ethanol per molecule of Si69 ($[(C_2H_5)O]_3Si(CH_2)_3]_2S_4$) in the filler according to the invention C, only 0.71 equivalents are still present. The silane has bonded to the surface of the silicic acid, releasing 5.29 equivalents of ethanol and forming Si—O—Si— bonds with the surface of the silicic acid.

The analytical values for the fillers according to the invention are shown in Table 1.

The compacted bulk density is determined according to DIN EN 787-11.

The samples are dried for 15–20 h at 105° C. and the BET surface area determined according to DIN 66131 (volumetric method).

The pore maxima for mesopores and macropores can be read off directly from the corresponding diagrams (cumulative intrusion volume (ml/g) or log differential pore volume (dV/dlog D) for the pore volume distribution (ml/g) as a function of the pore diameter (μm).

TABLE 1

| | Unit | Starting material VN3 silicic acid | Known pre-silanised silicic acid VP Coupsil 8108 | Pre-silanised silicic acid according to the invention, Example A | Pre-silanised silicic acid according to the invention, Example B | Pre-silanised silicic acid according to the invention, Example C |
|---|---|---|---|---|---|---|
| Compacted bulk density | g/l | 210 | 220 | 250 | 260 | 270 |
| BET surface area | m²/g | 178 ± 3 | 144 ± 3 | 142 ± 3 | 130 ± 3 | 157 ± 3 |
| Mesopore volume, (d = 2–30 nm) | ml/g | 0.43 ± 0.03 | 0.38 ± 0.03 | 0.40 ± 0.03 | 0.38 ± 0.03 | 0.33 ± 0.03 |
| Mesopore volume, (d = 2–50 nm) | ml/g | 0.94 ± 0.06 | 0.73 ± 0.06 | 0.82 ± 0.06 | 0.77 ± 0.06 | 0.69 ± 0.06 |
| Pore maximum, mesopores | nm | 19 ± 2 | 23 ± 2 | 22 ± 2 | 20 ± 2 | 19 ± 2 |
| Macropores, volume, (d > 30 nm) | ml/g | 2.65 ± 0.2 | 2.80 ± 0.2 | 2.47 ± 0.2 | 2.43 ± 0.2 | 2.92 ± 0.2 |
| Macropores, volume, (d > 50 nm) | ml/g | 2.30 ± 0.1 | 2.37 ± 0.1 | 2.06 0.1 | 2.06 ± 0.1 | 2.56 ± 0.2 |
| Pore maximum, macropores | nm | 2000 ± 200 | 2700 ± 200 | 2500 ± 200 | 2500 ± 200 | 20000 ± 2000 |
| Residual ethanol content | μmol/g prod. | 0 | 390 | 388 | 649 | 137 |

The coupling reagent Si 69 is a bis(triethoxysilylpropyl) tetrasulfane from Degussa AG. Ultrasil VN3 is a precipitated silicic acid from Degussa AG with a BET surface area of 170 m²/g. The pre-silanised silicic acid VP Coupsil 8108 is obtainable from Degussa AG as an experimental product. It is a silicic acid that is comparable to Ultrasil 7000 GR, with a BET surface area of 175 m²/g, which is pre-silanised with 8% Si 69.

Rubber Compounds

The formulation used for the rubber compounds is given in Table 2 below. The unit phr denotes contents by weight, relative to 100 parts of the crude rubber used. The general process for producing rubber compounds and their vulcanisates is described in the following book: "Rubber Technology Handbook", W. Hofmann, Hanser Verlag 1994, incorporated herein by reference.

TABLE 2

| Substance | Compound A/C In-situ Reference [phr] | Compound B [phr] | Compound D Reference [phr] |
|---|---|---|---|
| Stage 1 | | | |
| Buna VSL 5025-1 | 96 | 96 | 96 |
| Buna CB 24 | 30 | 30 | 30 |
| Ultrasil 7000 GR | 80 | — | — |
| Pre-silanised silicic acid according to the invention, example C | — | 83 | — |
| VP Coupsil 8108 | — | — | 83 |
| ZnO | 3 | 3 | 3 |
| Stearic acid | 2 | 2 | 2 |
| Naftolen ZD | 10 | 10 | 10 |
| Vulkanox 4020 | 1.5 | 1.5 | 1.5 |
| Protector G35P | 1 | 1 | 1 |
| Si 69 | 6.4 | — | — |
| Stage 2 | | | |
| Batch from stage 1 | | | |
| Stage 3 | | | |
| Batch from stage 2 | | | |
| Vulkacit D | 2 | 2 | 2 |
| Vulkacit CZ | 1.5 | 1.5 | 1.5 |
| Sulfur | 1.5 | 1.5 | 1.5 |

The polymer VSL 5025-1 is a solution-polymerised SBR copolymer from Bayer AG with a styrene content of 25 wt. % and a butadiene content of 75 wt. %. 73% of the butadiene is 1,2-linked, 10% cis-1,4-linked and 17% trans-1,4-linked. The copolymer contains 37.5 phr oil and displays a Mooney viscosity (ML 1+4/100° C.) of 50±4.

The polymer Buna CB 24 is a cis-1,4-polybutadiene (neodymium type) from Bayer AG with a cis-1,4 content of 97%, a trans-1,4 content of 2%, a 1,2 content of 1% and a Mooney viscosity of 44±5.

Naftolen ZD from Chemetall is used as aromatic oil. Vulkanox 4020 is a 6PPD from Bayer AG and Protektor G35P is an anti-ozonant wax from HB-Fuller GmbH. Vulkacit D (DPG) and Vulkacit CZ (CBS) are commercial products from Bayer AG.

Ultrasil 7000 GR is a readily dispersible precipitated silicic acid from Degussa AG with a BET surface area of 170 m$^2$/g.

The rubber compounds are produced in an internal mixer in accordance with the mixing instructions in Table 3.

TABLE 3

Stage 1

| Settings | |
|---|---|
| Mixing unit | Werner & Pfleiderer model E |
| Speed | 60 rpm |
| Ram force | 5.5 bar |
| Void volume | 1.581 |
| Fill ratio | 0.56 |
| Flow temp. | 70° C. |
| Mixing proc. | |
| 0 to 1 min | Buna VSL 5025-1 + Buna CB 24 |
| 1 to 3 min | ½ silicic acid or pre-silanised silicic acid, ZnO, stearic acid, Naftolen ZD |
| 3 to 4 min | ½ silicic acid or pre-silanised silicic acid, antioxidant |
| 4 min | Clean |

TABLE 3-continued

| 4 to 5 min | Mix |
|---|---|
| 5 min | Clean |
| 5 to 6 min | Mix and remove |
| Batch temp. | 145–150° C. |
| Storage | 24 h at room temperature |

Stage 2

| Settings | |
|---|---|
| Mixing unit | As for stage 1 apart from: |
| Speed | 70 rpm |
| Flow temp. | 70° C. |
| Fill ratio | 0.53 |
| Mixing proc. | |
| 0 to 2 min | Break up batch from stage 1 |
| 2 to 5 min | Maintain batch temperature at 150° C. by varying speed |
| 5 min | Remove |
| Batch temp. | 150° C. |
| Storage | 4 h at room temperature |

Stage 3

| Settings | |
|---|---|
| Mixing unit | As for stage 1 except for |
| Speed | 40 rpm |
| Fill ratio | 0.50 |
| Flow temp. | 50° C. |
| Mixing proc. | |
| 0 to 2 min | Remove batch from stage 2, accelerator, sulfur |
| 2 min | and sheet out on laboratory mixing rolls (diameter 200 mm, length 450 mm, flow temperature 50° C.) Homogenize: Score 3× on left, 3× on right and fold over and Pass through 8× with a narrow nip (1 mm) and 3× with a wide nip (3.5 mm) Remove sheet. |
| Batch temp. | 85–95° C. |

The rubber test methods are set out in Table 4.

TABLE 4

| Physical test | Standard/conditions |
|---|---|
| ML 1 + 4, 100° C., stage 3 | DIN 53523/3, ISO 667 |
| Cure-meter test, 165° C. | DIN 53529/3, ISO 6502 |
| Dmax–Dmin [dNm] | |
| t10% and t90% [min] | |
| Tensile test on ring, 23° C. | DIN 53504, ISO 37 |
| Tensile strength [MPa] | |
| Moduli [MPa] | |
| Elongation at break [%] | |
| Shore-A hardness, 23° C. [SH] | DIN 53 505 |
| Viscoelastic properties, 0 and 60° C., 16 Hz, 50 N initial force and 25 N amplitude force | DIN 53 513, ISO 2856 |
| Dynamic modulus E* [MPa] | |
| Loss factor tan δ [ ] | |
| Ball rebound, 23° C., 60° C. [%] | ASTM D 5308 |
| DIN abrasion, 10 N force [mm$^3$] | DIN 53 516 |

Example 1

In Example 1 the reference compound (A) mixed in situ with 6.4 phr of the coupling reagent Si 69 is compared with compound (B) with the silane-modified silicic acid according to the invention. The formulations used for compounds (A) and (B) are set out in Table 2, and the mixing instructions used are shown in Table 3. The results of the rubber tests are set out in Table 5.

TABLE 5

Results for Example 1

| Compound |  | (A) | (B) |
|---|---|---|---|
| ML (1 + 4) | [ME] | 63 | 67 |
| Dmax–Dmin | [dNm] | 16.6 | 18.4 |
| t10% | [min] | 1.8 | 1.3 |
| t90% | [min] | 28.2 | 31.7 |
| Shore-A hardness | [SH] | 63 | 61 |
| Tensile strength | [MPa] | 15.5 | 15.9 |
| Modulus at 100% | [MPa] | 1.6 | 1.7 |
| Modulus at 300% | [MPa] | 7.8 | 8.4 |
| RF 300%/100% | [ ] | 4.9 | 4.9 |
| Elongation at break | [%] | 450 | 440 |
| DIN abrasion | [mm$^3$] | 77 | 82 |
| Ball rebound, 60° C. | [%] | 59 | 62 |
| E* (0° C.) | [MPa] | 14.3 | 14.1 |
| tanδ (0° C.) | [ ] | 0.483 | 0.461 |
| E* (60° C.) | [MPa] | 6.4 | 6.4 |
| tanδ (60° C.) | [ ] | 0.146 | 0.144 |

As can be seen from the data in Table 5, the viscosities ML (1+4) for compounds (A) and (B) are at a comparable level and the vulcanisation characteristics are also similar. The static and dynamic data is likewise comparable within the limits of conventional variations in rubber tests. The identical value for the reinforcing factor RF 300%/100% for compounds (A) and (B) indicates an equally high silicic acid-silane bonding. This clearly shows that the use of the silicic acid according to the invention leads to rubber properties that are comparable with those of the in-situ reference.

Example 2

Example 2 shows that the rubber properties obtained by using the commercial pre-silanised silicic acid VP Coupsil 8108 (D) decline in comparison to the in-situ reference compound (C). Compounds (C) and (D) are based on the formulations given in Table 2. In a change from the mixing instructions used in Example 1 and set out in Table 2, in this example the first mixing stage is mixed at a speed of 70 rpm and a flow temperature of 70° C. and the second mixing stage at an initial speed of 80 rpm and a flow temperature of 80° C. The results are shown in Table 6.

TABLE 6

Results for Example 2

| Compound |  | (C) | (D) |
|---|---|---|---|
| ML (1 + 4) | [ME] | 60 | 82 |
| Dmax–Dmin | [dNm] | 18.9 | 22.1 |
| t10% | [min] | 1.6 | 1.1 |
| t90% | [min] | 23.2 | 36.0 |
| Shore-A hardness | [SH] | 62 | 69 |
| Tensile strength | [MPa] | 13.0 | 13.0 |
| Modulus at 100% | [MPa] | 1.9 | 2.3 |
| Modulus at 300% | [MPa] | 8.9 | 9.1 |
| RF 300%/100% | [ ] | 4.7 | 4.0 |
| Elongation at break | [%] | 380 | 380 |
| DIN abrasion | [mm$^3$] | 91 | 88 |
| Ball rebound, 23° C. | [%] | 32 | 33 |
| E* (0° C.) | [MPa] | 15.4 | 20.5 |
| Tanδ (0° C.) | [ ] | 0.486 | 0.502 |
| E* (60° C.) | [MPa] | 6.5 | 7.7 |
| Tanδ (60° C.) | [ ] | 0.138 | 0.144 |

The values from Table 6 show that the high level of the in-situ reference compound is not achieved when the known, pre-silanised silicic acid VP Coupsil 8108 is used. The higher Mooney viscosity, the higher Shore-A hardness and the higher dynamic moduli E* all indicate an unsatisfactorily homogeneous silanisation, leading to a higher filler network in compound (D). The reinforcing factor RF 300%/100% for compound (D) also drops significantly as compared with reference (C).

The advantage of using the silicic acids according to the invention lies in the fact that in contrast to the known use of in-situ silanisation according to the prior art with liquid silanes, such as e.g. Si 69, there is no need to perform a chemical reaction, requiring an optimum process control, during the mixing process. Furthermore, in the known in-situ silanisation considerable amounts of alcohol are disadvantageously released, escaping from the compound and leading to problems in the exhaust air.

The examples clearly show that the use of the pre-silanised silicic acids according to the invention results in rubber properties comparable to the prior art without causing the disadvantages mentioned above, such as arise in the known in-situ silanisation. By contrast, although the problem of ethanol evolution during mixing is avoided with the use of commercial pre-silanised silicic acids, such as e.g. VP Coupsil 8108, the good rubber properties of the in-situ reference are not achieved.

Obviously, numerous modifications and variations of the present invention are possible in light of the above teachings. It is therefore to be understood that within the scope of the appended claims, the invention may be practiced otherwise than as specifically described herein.

This application is based on German patent application serial No. 101 22 269.6, filed on May 8, 2001, and incorporated herein by reference.

The invention claimed is:

1. A silane-modified biopolymeric, biooligomeric, oxidic or siliceous filler obtained by reacting at least one biopolymeric, biooligomeric, oxidic or siliceous filler in a compressed gas with at least one silane, wherein the compressed gas is a supercritical gas, a critical gas or a gas in the liquefied region.

2. The silane-modified biopolymeric, biooligomeric, oxidic or siliceous filler according to claim 1, which contains between 0.1 and 50.0 wt. % silane.

3. A rubber compound, which comprises a rubber and the silane-modified biopolymeric, biooligomeric, oxidic or siliceous filler according to claim 1.

4. The rubber compound of claim 3, further comprising precipitated silicic acid and/or carbon black and/or other rubber auxiliary substances.

5. A method of producing a molded part, comprising molding the rubber compound of claim 3 into a molded part.

6. A method of producing an article selected from the group consisting of pneumatic tires for cars and lorries, tire treads for cars and lorries, tire components for cars and lorries, cable sheaths, tubes, drive belts, conveyor belts, roll coverings, bicycle and motorcycle tires and components thereof, shoe soles, sealing rings, profiles and damping elements, comprising incorporating the rubber compound of claim 3 into the article.

* * * * *